Dec. 19, 1967   R. E. TAYLOR   3,359,555
POLARIZATION DIVERSITY MONOPULSE TRACKING RECEIVER
Filed Aug. 30, 1966   4 Sheets-Sheet 1

INVENTOR
Ralph E. Taylor

BY *H McCoy* ATTORNEYS
*Carl Levy*

FIG. 2A.

INVENTOR
Ralph E. Taylor

BY
ATTORNEYS

INVENTOR
Ralph E. Taylor

United States Patent Office 3,359,555
Patented Dec. 19, 1967

3,359,555
POLARIZATION DIVERSITY MONOPULSE TRACKING RECEIVER
Ralph E. Taylor, Silver Spring, Md., assignor to the United States of America as represented by the National Aeronautics and Space Administration
Filed Aug. 30, 1966, Ser. No. 576,521
17 Claims. (Cl. 343—16)

ABSTRACT OF THE DISCLOSURE

In tracking a target, a monopulse array derives sum and difference signals for vertical and horizontal polarization. The two sum signals are applied to different phase locked loops, each loop including a phase detector and a mixer. The sum signals are also coupled to a third phase locked loop wherein a voltage controlled oscillator thereof feeds the mixers of the first and second phase lock loops such that the signals thereof are modified to be of the same phase. The phase adjusted signals from the mixers in the first pair of phase locked loops are utilized in the respective difference signal networks to control the phase of the difference signals so that they are aligned. The phase aligned difference signals are then combined in a polarization diversity combiner to derive a signal having a component proportional to the position of the target being tracked.

---

The invention described herein was made by an employee of the United States Government and may be manufactured and used by or for the Government for Governmental purposes without the payment of any royalties thereon or therefor.

The present invention relates generally to monopulse tracking systems and more particularly to a polarization diversity monopulse tracking system wherein the phase components of diverse polarization difference signals are aligned and then combined.

Polarization diversity in monopulse tracking systems for earth satellites and space probes has been employed widely because of the relatively weak signal strength of the energy impinging upon the antenna array. It has been found that deep and prolonged fades frequently occur in one polarization direction, for both linear and circular types of polarization, to preclude very accurate tracking. On the other hand, it has been found that fading does not generally occur in both polarization directions simultaneously, whereby accurate tracking can be maintained if a receiver is employed that is responsive to diverse polarizations, either linear and/or circular.

Prior art polarization diversity tracking systems, of the monopulse type, have generally employed R.F. switches at the antenna site for transferring between different polarization modes. While considerable effort has gone to improving radio frequency switches, they are still considered to be of relatively poor reliability. Even R.F. switches having exceptional reliability are bulky, heavy and introduce substantial losses into the R.F. signal coupled from the antenna site to the receiver equipment. Because the switches are generally carried on the antenna, their bulk and weight increase the problems associated with moving a massive structure with great precision. Another disadvantage attendant with the use of R.F. switches is the requirement for a relatively large number of hybrid networks in the coupling network between the antenna and receiver. The quantity of hybrids required is sufficiently great, in many instances, to attenuate the signal fed to the receiver so severely that the derivation of meaningful information is made more difficult.

According to the present invention, a polarization diversity monopulse tracking system is provided wherein the need for R.F. switches is completely obviated. In addition, the number of hybrids requires between the antenna and receiver is reduced, whereby the problems associated in the prior art with hybrid attenuation are minimized. The elimination of R.F. switches and reduction in the number of hybrids is accomplished by measuring the arbitrary phase difference between the monopulse summation signals of diverse polarization and utilizing this measurement to adjust the monopulse difference signals so that they are in-phase. The in-phase difference signals, which are at R.F. frequency and have not been detected, are linearly combined in a maximal-ratio or optimum type combiner to provide an indication of the location of an object being tracked. Because the difference signals are aligned or brought to the same phase as R.F. components, rather than as D.C. detected components, the sensitivity of the tracking system of the present invention is enhanced. Of course, D.C. detection of weak R.F. signals is to be avoided because of the inherent threshold of all D.C. detectors which results in decreased sensitivity for the receiver.

The phases of the diverse polarization difference signals are aligned by first aligning the phases of the diverse polarization sum signals to which the monopulse tracker responds. The sum signals have their phases aligned by employing three phase-locked loops. The first and second loops are directly responsive to the received sum signals of the two polarizations being considered and are controlled jointly by the third loop. The signals from the first two loops are linearly combined, after being aligned, and the combined signal is heterodyned with a fixed reference. The heterodyned signal is employed for controlling a voltage controlled oscillator of the third loop, the output of which is fed back to each of the first and second phase locked loops. By the feedback arrangement described, the outputs of the first two phase locked loops are maintained in phase.

Since, in a monopulse system, a fixed phase relationship always exists between the sum and difference signals from identical antenna elements for a particular arbitrary input polarization, the in-phase outputs of the first two phase locked loops can be employed to establish an in-phase relationship between the difference signals of the diverse polarizations. Phase alignment between the difference signals is accomplished by mixing the difference signal for the first polarization with the output of the first phase locked loop and heterodyning the difference signal for the second polarization with the output of the second phase locked loop. The side bands derived from the two heterodyning operations are of the same frequency and phase related.

Another aspect of the present invention is that the receiver tracks on the polarization direction where optimum signal strength lies. Maintaining optimum weighting of the polarization direction is accomplished by deriving A.G.C. signals directly proportional to the signal strength in the polarization directions being received. The derived A.G.C. signals control the gain of combiners responsive to corresponding signals of different polarization, whereby a particular combiner output directly reflects the sum or difference strength of both polarization directions. Hence, if fading should occur with one polarization, the combiner output attenuates the contribution due to the signal of that particular polarization and magnifies the contribution of the other polarization. Since fading does not generally occur simultaneously on two polarizations, this technique enables tracking of targets that under certain conditions were previously virtually untrackable.

Another feature of the present invention is that the same receiver can be employed for tracking linear polarizations in either direction, as well as right and left circular polarizations. Tracking of these four polarization modes is accomplished automatically without utilizing any R.F. switches.

According to one embodiment of the invention, the location of a target is determined with six channels extending between the antenna site and receiver. Three of the channels are employed for carrying information indicative of the sum and two difference mode signals in one polarization direction while the remaining channels carry signals indicative of the same information, but in the opposite polarization direction. The different polarization difference signals indicative of target location along one axis of the antenna array are combined to derive a signal proportional to the error of the antenna bore sight axis from the target location. Similarly, the other two diverse polarization difference signals, indicative of the target location at right angles to the first two difference signals, are combined to generate a voltage proportional to the off axis location of the target in the second direction. The error signals indicative of the target location relative to the antenna bore sight axis are utilized for controlling the position of the tracking antenna.

According to another embodiment, the number of channels between the antenna site and receiver is reduced from six to four by forming the difference signal in each polarization direction as a complex function, the phase angle of which is proportional to the target location off the antenna bore-sight axis.

Because of the phase locked loops employed, the tracking system of the present invention normally has a very narrow bandwidth, whereby target acquisition is relatively difficult. To obviate this factor, another feature of the present invention resides in changing the phase locked loop status of the system to an open loop mode during time periods when a strong signal target is being acquired, i.e., when the tracking system is attempting to lock onto a target. With the phase locked loops open, manual means are employed for increasing the bandwidth and adjusting the bandpass of the receiver. Once it has been ascertained that the target has been picked up by the antenna, the receiver is switched to a closed loop status and tracking commences automatically.

Even though the phase locked loops are open circuited while the receiver is in the acquisition mode, A.G.C. signals are derived by employing a Dicke radiometer detection technique. According to the Dicke radiometer detector technique, A.G.C. is maintained by sequentially tuning and detuning each receiver channel, whereby there are alternate periods of noise only and signal plus noise. The signal levels during the two stated periods are subtracted to derive an indication of signal level which is utilized for A.G.C. control of the linear combiners. The Dicke radiometer A.G.C. technique with the system in the open loop configuration is contrasted with a heterodyning system employed in the closed loop configuration for deriving the A.G.C. signal.

It is, accordingly, an object of the present invention to provide a new and improved monopulse polarization diversity tracking ssytem wherein the need for R.F. switches is obviated.

Another object of the present invention is to provide a monopulse polarization diversity tracking system capable of receiving signals of any polarization simultaneously.

Another object of the present invention is to provide a polarization diversity monopulse tracking receiver that automatically maintains itself at the optimum polarization direction.

An additional object of the present invention is to provide a monopulse polarization diversity tracking system having increased reliability, without the need, on an antenna array, for bulky and heavy parts, that introduce R.F. attenuation.

It is a further object of the present invention to provide a new and improved monopulse polarization diversity tracking receiver wherein the number of hybrids required is reduced, whereby the receiver has better sensitivity than prior art receivers.

Still another object of the present invention is to provide a new and improved monopulse polarization diversity receiver wherein radio frequency signals are linearly combined in a maximal-ratio or optimum pre-detection combining network.

Yet another object of the present invention is to provide a new and improved monopulse polarization diversity receiver capable of very accurately tracking targets while in one mode and capable of being switched to a second mode wherein targets considerably off the antenna system bore sight axis can be acquired.

A still further object of the present invention is to provide a polarization diversity monopulse tracking receiver wherein the phases of diversely polarized difference signals are adjusted to be in alignment so that the R.F. components can be combined in a maximal-ratio or optimum predetection combining network.

The above and still further objects, features and advantages of the present invention will become apparent upon consideration of the following detailed description of several specific embodiments thereof, especially when taken in conjunction with the accompanying drawings, wherein.

Figure 1:
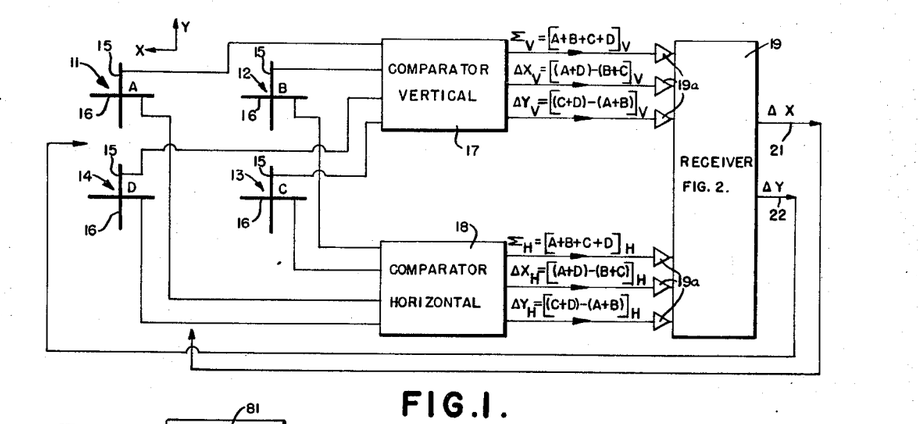
FIGURE 1 is a block diagram of one embodiment of the tracking system of the present invention.

Reference is now made to FIGURE 1 of the drawings wherein there is illustrated four antenna elements 11–14, located in mutually orthogonal relationships, so that each is at the corner of a square antenna array. Antenna elements 11–14 are mounted on a common movable frame, whereby the several elements are translated simultaneously and in like directions.

Each of antenna elements 11–14 includes a pair of transducers 15 and 16 for receiving electromagnetic energy polarized in the vertical and horizontal planes, respectively. For convenience, antenna elements 11, 12, 13 and 14 of the monopulse array illustrated, are denominated as A, B, C and D, respectively, while signals associated with vertical elements 15 are generally illustrated on the drawing as a V subscript while signals derived from horizontally directed transducers 16 have an H subscript.

The vertically polarized signals derived from transducers 15 of elements 11–14 are supplied to vertical comparator 17 which derives in a known manner signals indicative of the sum and differences of the electromagnetic energy impinging upon the several antenna elements. Similarly, the horizontally polarized energy derived from transducers 16 is supplied to horizontal comparator 18, whereby sum and difference signals indicative of the horizontally polarized energy are derived. The sum signal deriving from each of comparators 17 and 18 is responsive to the polarized energy with which the particular comparator is associated in accordance with $A+B+C+D$.

In contrast, the difference signals indicate the location of the target being tracked relative to the bore-sight axis of the array comprising elements 11–14, whereby the distance in the X direction is represented by the signal amplitude $(A+D)-(B+C)$, while the target location in the Y direction is represented by the signal amplitude proportional to $(C+D)-(A+B)$.

The six signals indicative of the sum and difference components for the two linear polarization directions are fed to a six-channel low-noise preamplifier (19a) and then via coaxial cable to receiver 19. Receiver 19 does not include any R.F. switches, but derives automatically, when the system is in the tracking mode, error signals on leads 21 and 22 to maintain the monopulse antenna array bore-sight axis aligned with the target being tracked. The signal on lead 21 is indicative of the error in the X direction of the antenna array and activates a servomechanism for driving the array towards the target in the X direction, while the signal on lead 22 causes the monopulse antenna array to be similarly driven in the Y coordinate direction.

Figure 2A:
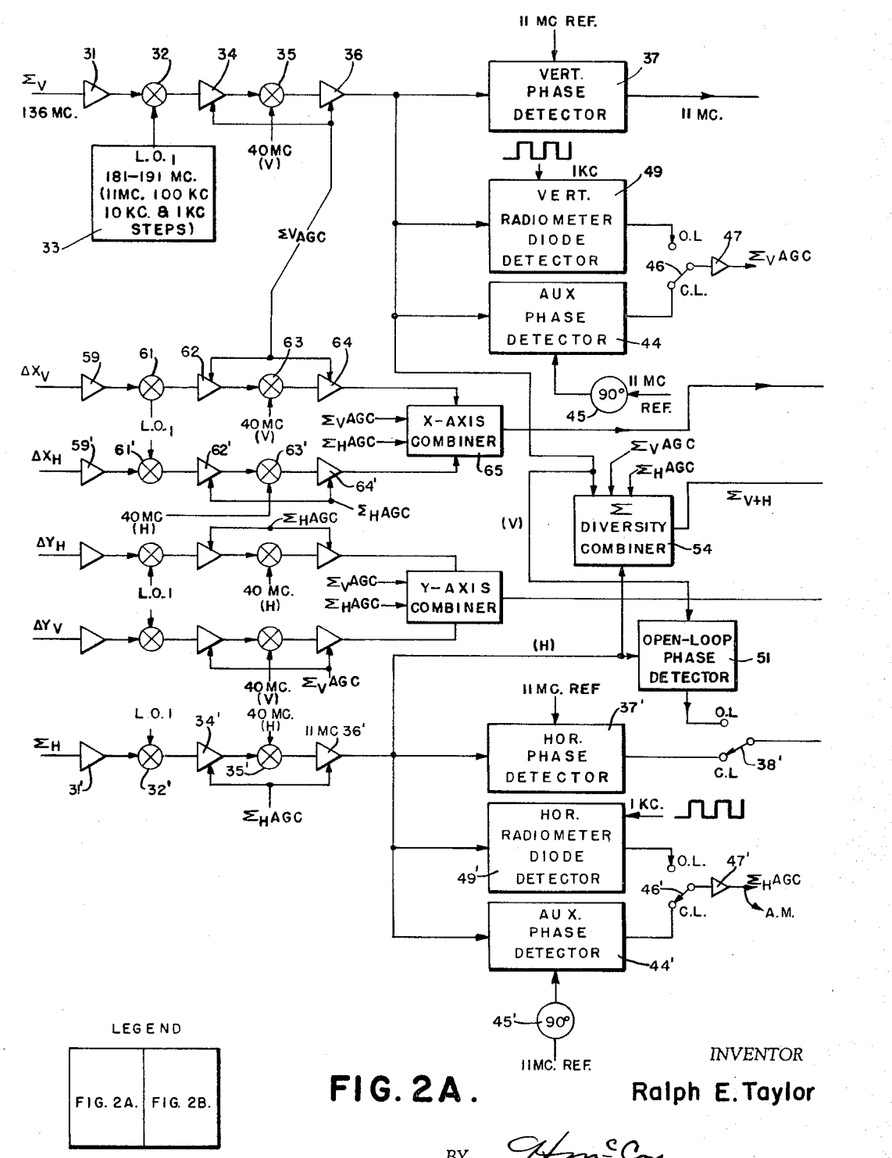
FIGURES 2A and 2B are circuit diagrams of one embodiment of the receiver of FIGURE 1, in block form.
Figure 2B:
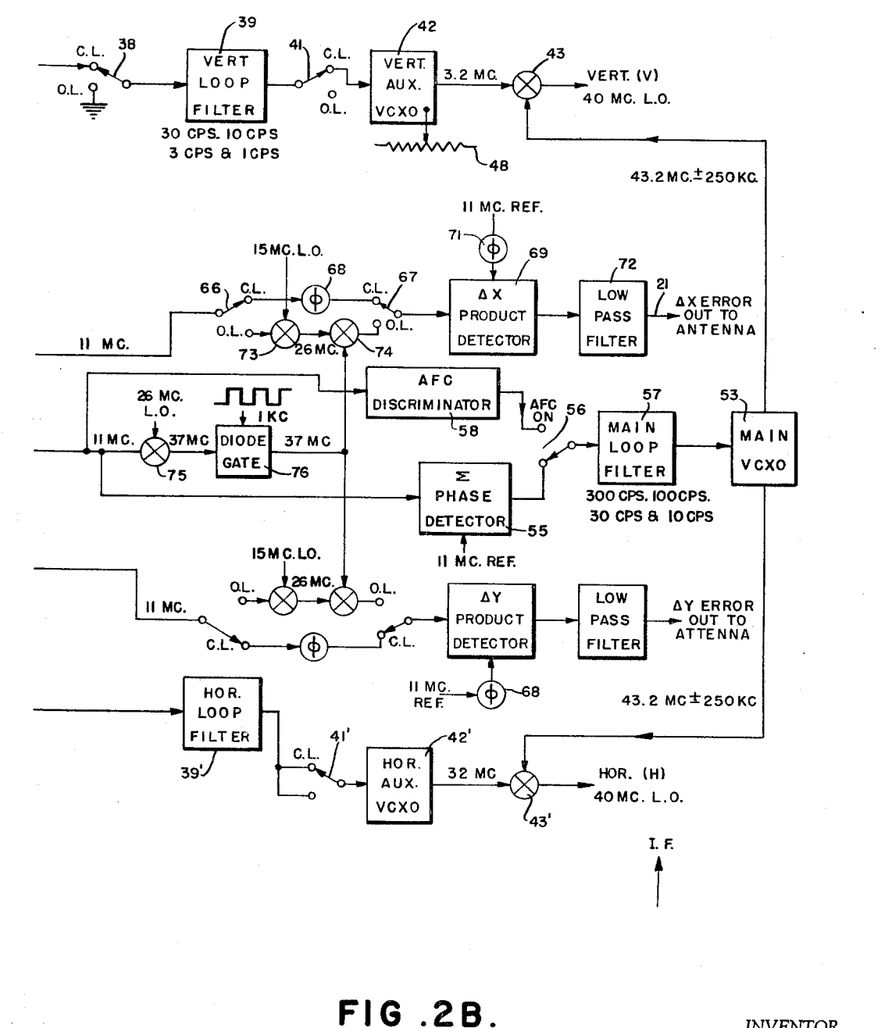

Reference is now made to FIGURE 2 of the drawings wherein there is illustrated a preferred circuit diagram for receiver 19, FIGURE 1. The three signals indicative of vertical polarization are known to have a predetermined phase relationship, whereby each of the difference signals is orthogonal to the sum signal, lagging or leading the sum signal by 90° depending upon the location of the target being tracked. Similarly, the three signals indicative of horizontal polarization are phase related, with the difference signals being at right angles relative to the sum signal. While a precise phase relationship exists at all times between the sum and difference components of one polarization direction, there is an arbitrary and completely random relationship between the phases of the sum and difference signals of the different polarization directions. Hence, for example, at one time instant there may be a 15° displacement between the sum signals associated with the vertical and horizontal polarizations while at a different time instant, the phase separation between these same two signals may be 50°. Broadly, it is the function of receiver 19 to align the phases of the sum signals for the vertical and horizontal polarizations. In response to alignment of the summation signals of the diverse polarizations, the difference signals are phase aligned, whereby the X coordinate R.F. difference signals of the two polarization directions can be combined in one network and the Y coordinate R.F. difference signals can be combined in a second network.

Broadly, receiver 19 includes three phase locked loops, one responsive to the sum signal indicative of vertical polarization, and a second responsive to the horizontal polarization sum signal. Phase modified signals in the first and second phase locked loops are linearly combined, and the combined signal is fed as the input to the third phase locked loop. The variable frequency signal deriving from the third loop is fed back to the first two loops, whereby the sum signals for the vertical and horizontal polarization directions are adjusted to be in-phase.

Consideration will now be given to the three phase locked loops discussed. To simplify the presentation and make it more explicit, it will be assumed hereafter that the electromagnetic radiation picked up by the antenna array including elements 11–14 has a frequency of 136 megacycles, whereby 136 megacycle R.F. signals are supplied to receiver 19. While the invention is to be described specifically in conjunction with 136 megacycle signals, it is to be understood that other frequencies can be and are employed. For example, an antenna-mounted frequency translation and microwave mixer assembly, including local oscillator, would allow operation up to 10,000 megacycles.

The first phase locked loop, responsive to the 136 megacycle vertical polarization summation signal, comprises amplifier 31, having a band pass between 130 and 140 megacycles. The output of amplifier 31 is applied to mixer 32, which is also responsive to the output of local oscillator 33, tunable between 181 and 191 megacycles in steps of 1, 10 and 100 kilocycles per second, as well as 1 megacycle. The specific frequency applied by local oscillator 33 to mixer 32 is determined by the target signal frequency picked up by the antenna array and is adjusted so that the mixer output has a difference frequency centered about 51 megacycles.

The I.F. output of mixer 32 is applied to I.F. amplifier 34, which is variable gain controlled to be directly proportional to the amplitude of the vertical polarization sum signal in a manner described infra. The signal derived from I.F. amplifier 34 is applied to mixer 35, having a second input of variable frequency, centered about 40 megacycles. The second input to mixer 35 is coincident with the output of the first phase locked loop and is indicated as the vertical component tracking frequency. The 11 megacycle difference frequency derived from mixer 35 is amplified by variable gain I.F. amplifier 36, the gain of which is controlled and is directly proportional to the signal strength of the vertical polarization summation component.

The first phase locked loop is completed by feeding the output of I.F. amplifier 36 to phase detector 37, that is also responsive to an 11 megacycle reference signal. The 11 megacycle reference signal is adjusted so that a 90° phase difference exists between it and the output of amplifier 36 when the signal being tracked lies exactly along the bore-sight axis of the antenna array. In response to the 90° phase difference between the input to phase detector 37, the detector derives a maximum amplitude, positive D.C. output signal. As the phase difference between the inputs to detector 37 varies, the D.C. output of the detector decreases, whereby a zero difference between the inputs results in a zero voltage output from the detector and a maximum negative D.C. voltage is derived when the phase difference between the inputs is 180° displaced from the condition which caused maximum positive D.C. output voltage from the detector.

With the system in the phase lock tracking mode, wherein the vertical polarization summation phase locked loop is completed, the output of phase detector 37 is coupled through switch 38 to low pass filter 39, the cut off frequency of which is adjustable in steps between 1, 3, 10 and 30 cycles per second. Increasing the cut off frequency of filter 39 reduces the tracking sensitivity threshold, but greater tracking sensitivity and exclusion of noise occurs for the narrower bandwidths. Furthermore, for simplicity the bandwidths of the first and second tracking loops are one-tenth of the main loop bandwidth.

With the system in the tracking mode, the output of filter 39 is coupled through switch 41 to voltage controlled oscillator 42, which derives an output of 3.2 megacycles in response to a D.C. signal equal to the maximum signal level derived from filter 39 being applied to it. The 3.2 megacycle derived from voltage controlled oscillator 42 is mixed with a 43.2 megacycle ±250 kc. output of the third or main phase locked loop in mixer 43. In response to the tracked target feeding a signal to the antenna array exactly equal to the frequency of local oscillator 33 minus 51 megacycles and the antenna array being positioned with its bore-sight axis aligned with the target, the output of mixer 43 is a 40 megacycle difference frequency having a phase angle of 90°. The 40 megacycle output of mixer 43 is fed back, inter alia, to mixer 35 to complete the first phase locked loop, i.e., the phase locked loop for tracking the vertical polarization sum signal.

To derive the vertical polarization sum A.G.C. signal and provide a voltage level indicative of the vertical polarization sum channel energy being received by the antenna array, the output of I.F. amplifier 36 is applied to phase detector 44. The other input to phase detector 44 is from the 11 megacycle reference source but is advanced in phase 90° by phase shifter 45 relative to the 11 megacycle signal applied to detector 37. Thereby, phase detector 44, in effect, serves as a product multiplier, whereby it derives maximum amplitude output in response to the 11 megacycle reference signal, applied to phase detector 37, being in phase with the 11 megacycle output of I.F. amplifier 36. As the phase and/or frequency of the output of amplifier 36 varies, the D.C. output of phase detector 44 decreases to derive a D.C. or low frequency output signal that is employed for A.G.C. purposes. Because phase detector 44 is effectively a product detector, its output is directly proportional to the amplitude of the vertical polarization sum signal and can be utilized for A.G.C. purposes.

With the system in the tracking mode, whereby the vertical polarization summation phase locked loop is completed, the output of detector 44 is fed through switch 46 to D.C. amplifier 47. The output of amplifier 47 is fed back to I.F. amplifiers 34 and 36, inter alia, to control the gain of these amplifiers in direct proportion to the signal strength of the vertical polarization summation energy received. The same amplifier 47 A.G.C. output is also fed to I.F. amplifiers 62 and 64 in the X vertical polarization error channel and to corresponding I.F. amplifiers in the Y vertical polarization error channel.

With the system in the open-loop tracking mode, rather than the phase lock tracking mode, the phase locked loop associated with the vertical polarization sum signal is broken by changing the positions of switches 38 and 41 from those illustrated to those designated on the drawing as O.L., whereby filter 39 is removed from the circuit and the frequency of voltage controlled oscillator 42 is determined by the position of manually activated potentiometer 48. With the loop broken, the output of phase detector 37 is compared in phase with the 11 megacycle reference applied to it by a human operator with the aid of an oscilloscope that is operated to provide Lissajous patterns. The operator varies the output frequency of oscillator 42 by controlling the input voltage thereof in response to movement of the slider of potentiometer 48 until approximately a circle (corresponding to 90° phase relationship) is observed on the oscilloscope phase comparing the 11 megacycle reference and output of detector 37. When the circle is observed on the oscilloscope, the operator switches the system to the phase lock track mode, wherein each of the switches illustrated is positioned as shown.

During the acquisition mode of the receiver, switch 46 may be positioned, if desired, to couple the output of radiometer diode detector 49 to A.G.C. amplifier 47. Radiometer diode detector 49 derives the A.G.C. voltage by alternately sampling the noise and signal plus noise levels fed into the system. As seen infra, detector 49 includes an I.F. amplifier that is successively responsive to noise alone and signal plus noise. The successive voltage levels derived indicative of noise and signal plus noise, which samples occur at a 1 kilocycle per second rate, are subtracted to derive an indication of the sum signal level. The result of the subtraction operation is a voltage directly proportional to the amplitude of the vertical polarization summation signal being fed to the antenna array.

The second phase locked loop responsive to the horizontal polarization summation signal is virtually identical with the phase locked loop responsive to the vertical polarization summation signal. In consequence, similar components of the horizontal polarization summation phase locked loop are provided on the drawing with the same numbers as the corresponding components of the vertical polarization summation phase locked loop, but with primes. Mixer 32′ is responsive to the same local oscillator 33 as feeds mixer 32 and detectors 37′ and 44′ respond to signals having exactly the same frequency and phase as detectors 37 and 44, respectively. Of course, the 40 megacycle output of mixer 43′ is fed back to mixer 35′ and variable gain amplifiers 34′ and 36′ in the horizontal sum channel (and corresponding variable gain amplifiers in both the X and Y horizontal error channels) respond to the horizontal polarization summation A.G.C. signal derived by amplifier 47′. Hence, in the closed loop mode while tracking takes place, the phase locked loop associated with the horizontally polarized summation signal functions exactly in the same manner as the phase locked loop associated with the vertical polarization summation signal.

In the open loop tracking mode configuration of the receiver, however, there is a distinction between the mode of operation of the two phase locked loops associated with the summation signals. In particular, the horizontal polarization summation loop is not actually broken under the manual control of an operator, but is slaved to the vertical polarization summation loop. Slaving of the horizontal polarization summation loop to the vertical polarization summation loop is accomplished by feeding the 11 megacycle output of I.F. amplifier 36 to phase detector 51, also responsive to the 11 megacycle output of I.F. amplifier 36′ in the horizontal sum channel. Phase detector 51 provides a maximum D.C. output signal when its two inputs are of like frequency but inphase or out of phase. The output signal of detector 51 is fed through switch 38′ (set to O.L.) to loop filter 39′. The output of loop filter 39′ is coupled through switch 41′, both of which contacts are shorted together, to the input of voltage controlled oscillator 42′. Since the variable frequency output of oscillator 42′ is coupled, via mixer 43′, to mixer 35′ (also to corresponding mixers in X and Y horizontal polarization channels), it is seen that the phase of the horizontal polarization summation channel, while in the open loop tracking mode, is slaved to the phase of the vertical polarization summation channel. As the operator changes the frequency of oscillator 42, the output of amplifier 36 is varied to cause the frequency and phase of oscillator 42′ to follow the frequency variations manually imposed upon oscillator 42.

The open loop mode is utilized to track targets that are not phase coherent, i.e., targets wherein phase is discontinuous, or targets that feed energy over a wide frequency band to the receiver system.

Consideration is now given to the third or main phase locked loop which responds to the frequency adjusted R.F. signals in the first and second loops to control the frequency of voltage controlled oscillator 53, the output of which is fed in parallel to mixers 43 and 43′. The third or main phase locked loop includes diversity combiner 54 which linearly adds the R.F. components fed to it by amplifiers 36 and 36′. The gain of combiner 54 is adjusted in response to the vertical and horizontal A.G.C. signals derived from amplifiers 47 and 47′, whereby the combiner output is a direct function of the signal levels of the vertical and horizontal summation components derived from the antenna array.

The output of diversity combiner 54 is applied to phase detector 55, also responsive to the 11 megacycle reference. The 11 megacycle reference signal applied to phase detector 55 is in-phase with the reference signals applied to detectors 37 and 37′, whereby phase detector 55 derives a maximum output voltage in response to its two input signals being in phase or out of phase. The two input signals for detector 55 are phased at 90° when the target being tracked derives a frequency and is positioned relative to the tracking antenna array so that the I.F. signals deriving from mixers 32 and 32′ have a frequency of 51 megacycles.

The output of phase detector 55 is coupled through switch 56 to low pass filter 57, having stepped band passes of 10, 30, 100 and 300 cycles per second. The components in filter 57 are selected so that the main phase locked loop is considered as a third order servo. The use of a third order servo for the phase locked loop is advantageous with the type of targets with which the present invention is utilized to track, generally a space vehicle, because as the target being tracked rotates, the Doppler frequency has a tendency to vary as a frequency ramp or linear frequency function, i.e., phase changes as a square law function. As is known, a phase locked loop of the third order type is capable of tracking a signal varying linearly in frequency with practically zero loop error, whereby the loop output is maintained in exact synchronism with changes in frequency of the signal received by the antenna array. The D.C. or low frequency output of filter 57, indicative of variations from the 90° phase point between the I.F. input to phase detector 55 and the 11 megacycle reference, is applied to voltage controlled oscillator 53.

Voltage controlled oscillator 53 derives an output that is centered at 43.2 megacycles and which varies about the center frequency by ±250 kilocycles to correct for Doppler frequency variations up to ±250 kilocycles. In response to the I.F. outputs of mixers 32 and 32' being equal in frequency, but of different phase, the voltage applied to oscillator 53 by filter 57 is such that the oscillator 53 frequency maintains the output of mixer 35 (and corresponding mixers in remaining five channels) at 11 megacycles. As the phase and/or frequency of the I.F. outputs of mixers 32 and 32' vary, the frequency of voltage controlled oscillator 53 is changed, whereby the I.F. outputs of amplifiers 36 and 36' are of the same frequency that has been corrected for Doppler frequency shifts by oscillator 53.

In the open-loop tracking mode, the Doppler frequency shifts can be corrected with an automatic frequency discriminator. To operate in this manner, phase detector 55 is removed and replaced by automatic frequency control discriminator 58 by altering the position of switch 56. Discriminator 58 is connected between combiner 54 and filter 57 so that the oscillator 53 frequency automatically maintains the output of mixer 35 (and corresponding mixers in remaining five channels) at 11 megacycles. Discriminator 58 derives a D.C. voltage that varies positively and negatively, depending upon whether the Doppler frequency shift is plus or minus, and the 11 megacycle I.F. center frequency may be manually adjusted or tuned by changing the oscillator 53 frequency. The manual adjustment on oscillator 42 insures that oscillators 42 and 42' are oscillating together within several cycles per second; a necessary condition for the phase lock tracking mode.

Consideration will now be given to the portion of the receiver for establishing error signals indicative of the off-axis location of the target in the X direction. Initially, the channel dealing with vertical polarization of error signals in the X direction is described. The $\Delta x_v$, vertical polarization X error signal, fed to the system by comparator 17 is initially fed through a low-noise preamplifier 19a, that establishes the system noise figure. The voltage gain of preamplifier 19a is sufficiently great to enable the receiver of FIGURE 2 to be remotely connected with long coaxial cables (up to several thousand feet). Amplifier 59 provides further signal amplification and is connected to mixer 61 that is responsive to the output frequency of local oscillator 33, whereby the oscillator derives an I.F. output signal at approximately 51 megacycles. The 51 megacycle signal derived from mixer 61 is applied to I.F. amplifier 62, of variable gain controlled by the vertical signal strength A.G.C. voltage derived by amplifier 47. The output of amplifier 62 is heterodyned in mixer 63 with the 40 megacycle output of the first phase locked loop, as derived by mixer 43. The 11 megacycle output of mixer 63 is applied to a further I.F. amplifier 64 having gain controlled by the A.G.C. voltage generated by amplifier 47. The 11 megacycle, amplitude adjusted output of amplifier 64 is applied as one R.F. input to X axis combiner 65, which has precisely the same circuit configuration as the sum channel diversity combiner 54.

The other input to X axis combiner 65 is derived from the horizontally polarized signal fed by comparator 18 to the receiver, indicative of the X position of the target relative to the bore-sight axis. The X axis horizontal polarization error signal ($\Delta x_h$) is fed to combiner 65 via components identical with those employed for feeding the $\Delta x_v$ signal to the combiner, whereby the circuits for processing the $\Delta x_h$ signal are denominated identically with those for the $\Delta x_v$ but have primes. The only exceptions between the two channels are that: amplifiers 62' and 64' are responsive to the A.G.C. output of amplifier 47', indicative of the horizontal polarization signal strength; and mixer 63' is fed with the output of the second phase locked loop, as derived from mixer 43'.

Because a fixed 90° phase relationship always exists between the R.F. signals applied to amplifiers 31 and 59, the outputs of mixers 35 and 63 are also displaced by 90°. Similarly, the outputs of mixers 35' and 63' are also phased 90° apart. Because the I.F. outputs of mixers 35 and 35' are adjusted to be equal in frequency to each other, in response to the variable frequency signals derived by mixers 43 and 43', the I.F. outputs of amplifiers 64 and 64' are likewise adjusted to be equal. Consequently, the R.F. signals applied to combiner 65 are always of like phase and combining of the R.F. components is possible, whereby it is not necessary to detect the R.F. components. Of course, detection of the R.F. components prior to their being combined is to be avoided to provide a receiver of maximum possible sensitivity.

The R.F. components applied to combiner 65 are linearly added under the control of the A.G.C. signals. As indicated infra, if the signal strength of both the vertical and horizontal channels is equal, whereby the outputs of amplifiers 47 and 47' indicate the same input signal, equal weight is given to both the vertical and horizontal difference signals applied to combiner 65. When, however, one of the polarizations fades, the gain of combiner 65 is adjusted so that the signal level of the other channel is increased and the gain of the fading channel is decreased. For example, if it is assumed that the horizontal polarization channel fades, whereby the output of amplifier 47' decreases while the signal derived by amplifier 47 increases, combiner 65 attenuates the $\Delta x_h$ signal applied to it and amplifies the $\Delta x_v$ signal. Consequently, the output of the combiner remains relatively constant and tracking is maintained automatically without being adversely affected by fading in the horizontal input from the antenna.

To establish the tracking error signal for the X direction while the system is in the closed loop configuration, the 11 megacycle output of combiner 65 is applied via switches 66 and 67 and phase shifter 68 to product detector 69. Product detector 69 is also responsive to the 11 megacycle reference signal, after suitable phase shift as introduced by phase shifter 71. Phase shifters 68 and 71 are inserted to compensate for transmission line length and phase shift in the system, whereby the output of product detector 69 is zero when the target lies on the bore-sight axis between antenna elements 15 and 16. The D.C. or low frequency output signal of product detector 69 is fed through low pass filter 72 to lead 21, wherein the error signal is generated by controlling the position of the antenna array in the X coordinate direction.

Consideration will now be given as to the manner in which the X error signal on lead 21 is derived when the receiver is in the open loop tracking mode. With the receiver in the open-loop tracking mode, switches 66 and 67 are set, whereby the output of combiner 65 is fed to mixer 73, that also responds to a 15 megacycle local oscillator signal. The 26 megacycle sum frequency derived by mixer 73 is applied to a further mixer 74. The local oscillator 37 megacycle signal from the diode gate 76 applied to mixer 74 is responsive to the 11 megacycle output of diversity combiner 54, after heterodyning in mixer 75 with the output of a 26 megacycle local oscillator. The 37 megacycle sum frequency signal generated by mixer 75 is successively gated, at a 1 kilocycle rate, through a conventional diode gate 76. Diode gate 76 is switched synchronously and in phase with the 1 kc. rate of radiometer diode detectors 49 and 49' so that the gate is open to allow the 37 megacycle signal to be coupled to mixer 74 during the interval only when the radiometer detector 49 is sampling signal and noise. By gating the 37 megacycle signal from mixer 75 through gate 76 in synchronism with the derivation of only noise (without signal) by radiometer detector 49, the noise level of the system has been found to be reduced by 3 db during the open loop tracking mode of the receiver when the radiometer A.G.C. is used.

It is known that the Y axis error signals ($\Delta y$) derived by comparator 17 are always in phase or 180° out of phase from the X axis error signals derived by the comparator, depending upon the relative position of the target being tracked to the antenna array bore-sight axis. Consequently, there exists a constant 90° phase difference between the sum signal generated by comparator 17 and the Y axis error signal generated by it. Similarly, there always exists a 90° phase difference between the sum and Y axis difference signals derived by comparator 18 for the horizontal polarization channel. Because of the fixed relationship between the sum and difference signals, for each respective polarization direction, the horizontal and vertical Y axis error signals ($\Delta y_h$ and $\Delta y_v$, respectively) generated by comparators 17 and 18 are slaved to exactly the same phase in response to the outputs of mixers 43 and 43' in precisely the same manner as indicated supra for the $\Delta x_v$ and $\Delta x_h$ signals. Hence, there is believed to be no need to describe specifically the apparatus employed in the channel wherein the Y error output signal is generated.

Consideration will now be given to the specific apparatus employed in one of the combiners illustrated in FIGURE 2. For purposes of illustration, combiner 54 for the vertical and horizontal polarization summation signals is described, although it is to be understood that the X and Y channel combiners are exactly the same as the described combiner.

Figure 3:
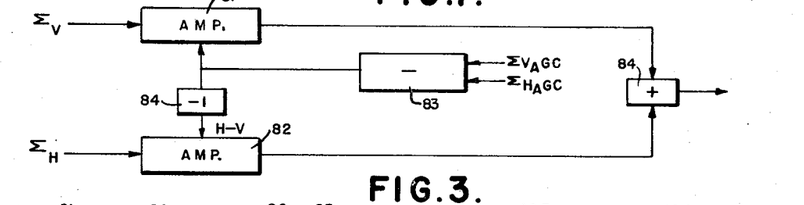
FIGURE 3 is a circuit diagram of one of the maximal-ratio or optimum combiners of the receiver of FIGURE 2.

Combiner 54 is illustrated specifically by FIGURE 3, wherein variable gain amplifiers 81 and 82 are respectively responsive to the 11 megacycle vertical polarization and horizontal polarization summation signals. The gains of amplifiers 81 and 82 are controlled by the difference between the A.G.C. signals derived by amplifiers 47 and 47'. The vertical and horizontal polarization A.G.C. signals are applied to difference network 83, the output of which is a D.C. or low frequency voltage directly proportional to ($\Delta_{v\ A.G.C.} - \Delta_{h\ A.G.C.}$). The output of difference network 83 is applied directly to amplifier 81, but is changed in polarity by inverter 84, prior to being applied to amplifiers 82.

Thereby, if the vertical and horizontal polarization A.G.C. voltages applied to difference network 83 are alike, amplifiers 81 and 82 are maintained at a quiescent and equal bias level and gain, so their output levels are substantially identical. If the vertical polarization channel should fade, for example, the gain of amplifier 82 is increased while the gain of amplifier 81 is decreased. In consequence, the R.F. signal derived by amplifier 82 is of larger amplitude than the vertical polarization summation signal derived by amplifier 81. In exactly the same manner, the output of amplifier 81 is increased while the voltage derived by amplifier 82 is lowered if fading should occur in the horizontal polarization channel.

The outputs of amplifiers 81 and 82 are linearly combined by adding network 84. The phase shifts of amplifiers 81 and 82 and adding network 84 do not affect the in phase components of the vertical and horizontal polarization sum signals so that they are numerically added at the output of adder 84.

Figure 4:
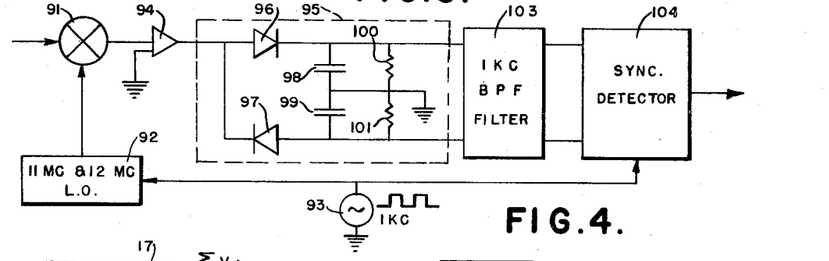
FIGURE 4 is a circuit diagram of one of the radiometer networks of FIGURE 2.

Reference is now made to FIGURE 4 wherein radiometer diode detector 49 is specifically illustrated. The radiometer detector comprises mixer 91, responsive to a sum I.F. 11 megacycle output from amplifier 36 and local oscillator 92. Local oscillator 92 comprises a pair of separate oscillators, one of which is tuned to operate at 11 megacycles and the other at 12 megacycles. The outputs of the two sources comprising local oscillator 92 are connected through separate switches and fed to mixer 91. Local oscillator 92 is switched, at a 1 kilocycle per second rate by source 93, from 11 megacycles to 12 megacycles, whereby the I.F. output of mixer 91 is adjusted from D.C. to 1 megacycle.

The output of mixer 91 is fed through D.C. amplifier 94, having a bandwidth of at least 1.2 megacycles, to square-law detector 95. Square-law detector 95 subtracts the noise level fed through mixer 91 and amplifier 94 during the interval when local oscillator 92 has an output frequency of 12 megacycles from the signal plus noise level fed through the mixer and amplifier when the local oscillator is switched to an 11 megacycle output frequency. To subtract the two levels, the output of amplifier 94 is applied in parallel to diodes 96 and 97, the cathode of 96 and anode of 97 being connected to opposite terminals of series connected capacitors 98 and 99. The common terminal of capacitors 98 and 99 is connected to ground and the junction of resistors 100 and 101 which shunt the capacitors for allowing charge to leak from them.

The difference voltage existing between opposed terminals of resistors 100 and 101 is applied through bandpass filter 103, having a center frequency of 1 kilocycle per second. The 1 kilocycle output of filter 103 is applied to synchronous detector 104 that also responds to the 1 kilocycle output of source 93. Detector 104 is similar to detectors 69 of the receiver in that it derives an output voltage of maximum amplitude when its inputs are in phase, or 180° out of phase, and a zero voltage is generated by it in response to the two 1 kilocycle signals applied to it being 90° displaced in phase.

Because the theory of operation of a conventional radiometer network is described fully in an article by R. H. Dicke entitled, "The Measurement of Thermal Radiation at Microwave Frequencies," in the July 1946 Review of Scientific Instruments, no detailed description of its mode of operation is given.

Figure 5:
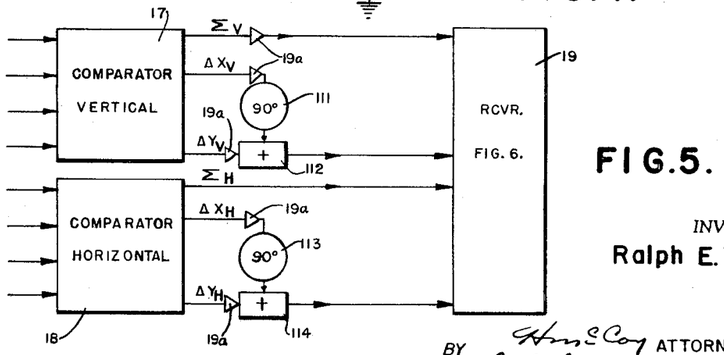
FIGURE 5 is a partial block diagram of a conventional tracking system used operationally to convert a six-channel antenna system into four channels that are connected to the four-channel receiver shown in FIGURE 6.
Figure 6:
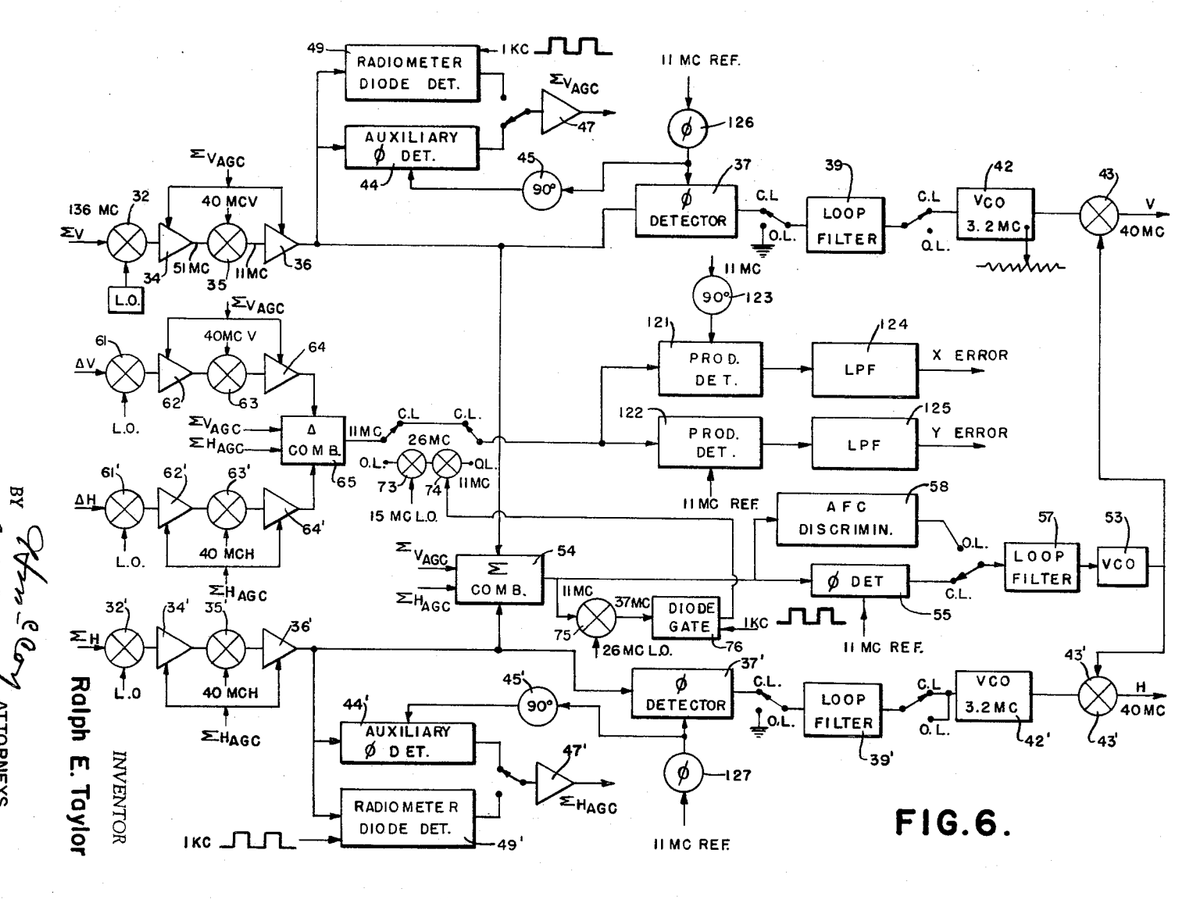
FIGURE 6 is a circuit diagram, in block form, of the receiver of FIGURE 5, a second embodiment of the present invention, illustrating the portions which are different from those in FIGURE 2.

Reference is now made to FIGURE 5, a partial schematic diagram showing how four-channel receiver 19 of FIGURE 6 may be connected to a conventional six-channel antenna such as that in FIGURE 1 using comparator networks 17 and 18. Each of comparators 17 and 18 has four input signals identically the same as the input signals to the comparators of FIGURE 1. The four input signals to the comparators of FIGURE 5 are derived from the same type of antenna configuration as the system of FIGURE 1.

The outputs of the comparators of FIGURE 5 are combined after being coupled to the low-noise preamplifiers 19a which in turn are connected to receiver 19. In particular, the elevation and azimuth or Y and X axis difference signals derived from vertical comparator 17 are linearly combined, after the X difference signal has been modified in phase by 90° by phase shifter 111. The phase shifted X difference signal is combined with the Y difference signal in a linear adder 112 (such as a coaxial hybrid), the output of which is an R.F. wave (e.g., 136 megacycles) having amplitude and phase related to the vector sum of the X and Y difference outputs of comparator 17. The complex signal is fed to receiver 19 and processed in a channel similar to the difference channel employed in the receiver of FIGURE 1. In a similar manner, the horizontal polarization difference components are vectorially added by feeding the X difference signal through the preamplifier 19a and the 90° phase shifter 113 and combining the output of the phase shifter in a linear added 114 with the Y difference signal.

Receiver 19 responds to its four inputs in a manner described infra to derive X and Y error signals for controlling the antenna array and maintaining its bore sight axis aligned with the target.

It is to be understood that the orthogonal array specifically illustrated in FIGURE 1 is only one configuration that can be employed. Exemplary of another antenna and coupling system that can be employed for deriving the four channel information is the logarithmic spiral configuration and hybrid network described and illustrated by the copending application of J. Paul Shelton, Jr., commonly assigned with the present application. In particular, the eight arm antenna of FIGURE 17 disclosed in the Shelton application can be employed for deriving, in response to the circularly polarized signals, the four channel sum and difference data, in the manner described in conjunction with FIGURE 19 of the Shelton application. The orthogonal array of FIGURE 1 can also be employed for sensing circularly polarized signals with either the system illustrated in FIGURE 1 or FIGURE 5 because the array inherently separates the circular polarization components and establishes them as orthogonal components.

Consideration is now given to the details of the receiver responsive to the four channel information, by referring to FIGURE 6. The receiver of FIGURE 6 is quite similar to that of FIGURE 2 since it includes two auxiliary phase locked loops, respectively responsive to the vertical and horizontal polarization sum signals, and a third phase locked loop responsive to phase controlled signals in the first two loops. The circuitry for the three loops is identical with that of the network of FIGURE 2 and hence a description thereof is not repeated. Suffice it to state that the three loops operate jointly so that the I.F. signals derived by amplifiers 36 and 36' are adjusted to be in phase and these phase aligned signals are fed to R.F., predetection linear combiner 54. The three phase locked loops operate in both the phase lock and open-loop tracking modes precisely in the same manner described supra.

The difference channel network is also quite similar to the difference channel networks employed in the six channel system of FIGURE 2. In particular, the predetection combining apparatus responsive to the complex difference signals of the vertical and horizontal polarizations is precisely the same as the X difference combining network described supra. There is, however, a slight difference in the manner in which the predetection combining network of FIGURE 6 operates relative to the X channel combiner of the receiver of FIGURE 1.

It is to be recalled that the receiver of FIGURE 2 always has a 90° phase displacement between the vertical polarization sum and difference signals and that a 90° phase difference also exists between the horizontal polarization sum and difference components. There is, however, an arbitarary phase difference between the difference signals of the two polarization directions in the system of FIGURE 2.

The system of FIGURE 6 is different from that of FIGURE 2 since an arbitrary phase difference occurs, for example, between the vertical polarization sum and complex difference signals. This phase difference between the complex difference signal vector and the sum signal is a function of target position relative to the antenna array bore sight axis, as indicated in the book, Basic Principles of Monopulse Radar, by Rhodes, 1959, at pages 72 and 73. Similarly, an arbitrary phase difference exists between the sum and complex difference components in the horizontal polarization direction. However, there is a fixed phase difference between the orthogonal components of the complex difference signal and the corresponding sum channel of the same polarization. The fixed phase difference may be 0°, 90° or 180° depending on which side of the bore-sight axis the target is positioned. Because the three phase locked loops in FIGURE 6 adjust the horizontal and vertical I.F. output signals of amplifiers 36 and 36' to be in phase and the difference channel is slaved to the changes imposed upon the sum channels, the two input signals to combiner 65 in the difference channel are in phase. Because the horizontal and vertical complex I.F. inputs to combiner 65 from amplifiers 64 and 64' are in phase, the predetection maximal ratio or optimum combining technique can be employed.

The complex 11 megacycle signal generated by combiner 65 is now processed to separate the X and Y components. The X and Y components are separated by feeding the output of combiner 65 in parallel to product detectors 121 and 122. Product detector 122 is directly responsive to the 11 megacycle reference while product detector 121 is fed by the 11 megacycle reference through 90° phase shifter 123. Hence, the outputs of product detectors 121 and 122 are D.C. or slowly varying A.C. voltages indicative of the orthogonal components derived from combiner 65. Since the inputs to combiner 65 are difference signals having complex values variable in phase dependent upon the position of the target energy impinging on the antenna array, the outputs of the product detectors are in turn indicative of the X and Y error signals. The outputs of product detectors 121 and 122 are respectively applied to low pass filters 124 and 125 which generate the signals for controlling the X and Y position of the antenna array.

One slight difference between the receiver of FIGURE 6 and that of FIGURE 2 is that in the former phase detectors 37 and 37' in the two auxiliary phase locked loops do not respond directly to the 11 megacycle reference. Instead, the reference is applied to the phase detector through variable phase shifters 126 and 127, preadjusted for accurate operation of the system. Because phase adjusters 126 and 127 are employed with the network of FIGURE 6, there is no need to provide phase shifters 68 and 71 in the difference channel. To obtain accurate A.G.C. voltages with the network of FIGURE 6, phase detectors 44 and 44' are fed with the phase adjusted voltages deriving from phase shifters 126 and 127.

While I have described and illustrated several specific embodiments of my invention, it will be clear that variations of the details of construction which are specifically illustrated and described may be made without departing from the true spirit and scope of the invention as defined in the appended claims.

I claim:

1. In a monopulse tracking system responsive to radiation of arbitrary polarization, a signal source for deriving first and second sum signals indicative of the amount of radiation received by said array in first and second polarization directions, respectively, and for deriving first and second difference signals indicative of the position of a source of said radiation, said first and second difference signals being respectively indicative of difference components polarized in said first and second directions, said first and second sum signals having an arbitrary phase difference equal to the phase difference between said difference signals, means responsive to the phase difference between said sum signals for aligning said difference signals into the same phase, and means for linearly combining said phase aligned difference signals.

2. The system of claim 1 wherein said signal source comprises an array of transducers for deriving a pair of components in each of said polarization directions, means responsive to each of said transducers for adding and subtracting the component in said first polarization directions while separately adding and subtracting the components in said second polarization direction thereby to derive said sum and difference signals.

3. The system of claim 2 wherein said means for deriving includes means for deriving a difference signal in each of said polarization directions indicative of the position of a tracked target along a pair of orthogonal axes of said array.

4. The system of claim 3 wherein said difference signal deriving means for each polarization direction includes a pair of separate channels.

5. The system of claim 3 wherein said difference signal deriving means for each polarization direction includes a single channel including means for forming the vector sum of the components along the orthogonal axes.

6. The system of claim 1 wherein said aligning means includes: first and second channels respectively responsive to said first and second sum signals for deriving signals of like phase, each of said channels including a separate oscillator having an output frequency varied in response to the input signal magnitude applied to it; means for combining the like phase signals derived from said channels; and means for controlling the output frequency of said oscillators in response to the phase of the signal derived from said combining means.

7. The system of claim 6 wherein said means for phase aligning comprises first and second heterodyning means respectively responsive to said first and second difference signals and the signals derived from the oscillators of said first and second channels.

8. The system of claim 7 wherein each of said first and second channels includes means for deriving an A.G.C. signal substantially directly proportional to the amplitude of the sum signal applied to it, and means responsive to said A.G.C. signals for varying the magnitude of the signals to be combined in substantially direct proportion to the relative signal strength of said sum signals.

9. The system of claim 7 including means responsive to said sum signals for varying the magnitude of the signals to be combined in substantially direct proportion to the relative signal strength of said sum signals.

10. The system of claim 7 including means responsive to said sum signals for varying the magnitude of the sum signals to be combined in substantially direct proportion to the relative signal strength of said sum signals.

11. The system of claim 1 including means responsive to said sum signals for varying the magnitude of the signals to be combined in substantially direct proportion to the relative signal strength of said sum signals.

12. The system of claim 1 wherein said aligning means includes first, second and third phase locked loops, said first and second loops being responsive respectively to said first and second sum signals, and including means for deriving output signals of like phase and frequency; said third phase locked loop including: means for linearly combining the output signals of said first and second phase locked loops, and means for deriving a variable frequency signal in response to the phase of the combined signal deriving from said last-named combining means; and means for applying said variable frequency signal to both said first and second loops to control the frequency of said loops.

13. The system of claim 12 further including means in said first and second loops for deriving A.G.C. signals respectively proportional to the signal strengths of said first and second sum signals, and means responsive to said A.G.C. signals for varying the magnitude of the signals to be combined in substantially direct proportion to the relative signal strength of said sum signals.

14. The system of claim 13 wherein each of said A.G.C. signal deriving means includes means for multiplying a signal in each phase locked loop with a reference.

15. The system of claim 12 including means for at will open circuiting one of said loops, means for manually changing the frequency of the open circuited loop, and means for interconnecting said loops so that the frequencies derived by said other two loops are varied in response to variations in frequency imposed on said open circuited loop by said manual means.

16. The system of claim 15 further including means in said first and second loops for deriving A.G.C. signals respectively proportional to the signal strengths of said first and second sum signals, and means responsive to said A.G.C. signals for varying the magnitude of the signals to be combined in substantially direct proportion to the relative signal strength of said sum signals.

17. The system of claim 16 wherein each of said A.G.C. signal deriving means includes means for multiplying a signal in each phase locked loop with a reference while said one loop is not open circuited, and means responsive to the relative amplitudes of the signal and noise in said first and second channels for deriving said A.G.C. signals while said one loop is open circuited.

References Cited

UNITED STATES PATENTS 3,209,355  9/1965  Livingston __________ 343—100
3,259,879  7/1966  Cook ______________ 343—16 X RICHARD A. FARLEY, *Primary Examiner.*

RODNEY D. BENNETT, *Examiner.*

J. P. MORRIS, *Assistant Examiner.*